US010972313B2

(12) United States Patent
Imamura (10) Patent No.: US 10,972,313 B2
(45) Date of Patent: Apr. 6, 2021

(54) RELAY DEVICE

(71) Applicant: YOKOGAWA ELECTRIC CORPORATION, Tokyo (JP)

(72) Inventor: Yoshihiro Imamura, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 5 days.

(21) Appl. No.: 16/297,430

(22) Filed: Mar. 8, 2019

(65) Prior Publication Data
US 2019/0280896 A1 Sep. 12, 2019

(30) Foreign Application Priority Data
Mar. 9, 2018 (JP) .............................. JP2018-043195

(51) Int. Cl.
*H04L 12/66* (2006.01)
*H04L 12/863* (2013.01)
*H04L 29/08* (2006.01)

(52) U.S. Cl.
CPC .......... *H04L 12/66* (2013.01); *H04L 47/6215* (2013.01); *H04L 67/1097* (2013.01); *H04L 67/12* (2013.01)

(58) Field of Classification Search
CPC .. H04L 12/66; H04L 47/6215; H04L 67/1097
See application file for complete search history.

(56) References Cited

U.S. PATENT DOCUMENTS 8,208,897 B2 * 6/2012 Kaneko ................. H04W 8/245
   455/410
9,652,971 B1 * 5/2017 Trundle ............. G08B 21/0275
10,419,519 B2 * 9/2019 Yamamura .............. H04L 67/06
(Continued)

FOREIGN PATENT DOCUMENTS

JP       2005-071007 A       3/2005
JP       2008-109534 A       5/2008
(Continued)

OTHER PUBLICATIONS

IoT gateway for Siemens industry "SIMATIC (registered trademark) IoT2020" <https://jp.rs-online.com/web/p/iot-development-kits/1244037/>, with partial English translation (3 pages).
(Continued)

*Primary Examiner* — Joshua D Taylor
*Assistant Examiner* — Adil Ocak
(74) *Attorney, Agent, or Firm* — Osha Bergman Watanabe & Burton LLP (57) ABSTRACT

A relay device includes: a memory; and a hardware processor coupled to the memory. The hardware processor: receives data from a sensor; backs up the data from the sensor, in the memory, to store data failed to be transmitted to a server on a network; determines, based on a server communication status representing a state of data transmission to the server, a priority for data to be transmitted to the server among the data from the sensor and the backed-up data; transmits, to the server, data determined to have a highest priority among the data from the sensor and the backed-up data; and determines the server communication status based on whether communication with the server fails.

8 Claims, 8 Drawing Sheets

(56) References Cited

U.S. PATENT DOCUMENTS

| | | |
|---|---|---|
| 2011/0268126 A1 | 11/2011 | Matsuo |
| 2012/0185187 A1* | 7/2012 | Parakulam ............... H04Q 9/00 702/63 |
| 2013/0040557 A1 | 2/2013 | Shiizaki et al. |
| 2018/0220353 A1* | 8/2018 | Mendiola .............. H04W 88/04 |
| 2020/0195452 A1 | 6/2020 | Miyamoto et al. |

FOREIGN PATENT DOCUMENTS

| | | |
|---|---|---|
| JP | 2011-234207 A | 11/2011 |
| JP | 2012-204963 A | 10/2012 |
| JP | 2018-036923 A | 3/2018 |
| WO | 2011-135615 A1 | 11/2011 |

OTHER PUBLICATIONS

"SIMATIC (registered trademark) IoT2020" English Manual (2 pages).

* cited by examiner

RELAY DEVICE

CROSS-REFERENCE TO RELATED APPLICATION

This application claims priority from Japanese Patent Application No. 2018-043195 filed on Mar. 9, 2018, which is incorporated herein by reference in its entirety.

BACKGROUND

Technical Field

The present invention relates to a relay device such as a gateway (registered trademark) installed between an Internet of Things (IoT) device and a server on a network.

Related Art

In order to collect information from various sensors, which are IoT devices connectable to the Internet, and in order to transmit the information to a server on a network in a plant or a factory manufacturing process, an IoT gateway for relaying data may be introduced as disclosed in IoT gateway for Siemens industry "SIMATIC (registered trademark) IoT 2020" https://jp.rs-online.com/web/p/iot-development-kits/1244037/. For data transmission from the IoT gateway to the server, in addition to wired communication, cellular communication such as 3G/LTE which is wireless communication may be used.

However, in cellular communication, communication may be temporarily interrupted in an unstable situation where a radio wave condition is poor. That is, the IoT gateway cannot transmit sensor data, which is information collected from the sensor, to the server during time from the interruption of the communication to the restoration of the communication. In this case, data needs to be continuous in a data calculation relating to statistical processing in the server. For example, when a minimum value and a maximum value of the data in a predetermined period is calculated, an error may occur as a result of the data calculation because the sensor data is lost in a period during which transmission cannot be performed. Further, when the server determines an abnormality or the like in the manufacturing process based on the result of the data calculation, an error may occur in the determination.

SUMMARY

According to one or more embodiments of the present invention, a relay device includes a backup management unit, a priority determination unit and a server communication unit. The backup management unit receives data based on a sensor and backs up the data based on the sensor to store the data failed to be transmitted to a server on a network. The priority determination unit determines a priority of data to be transmitted to the server among the data based on the sensor and the data backed up in the backup management unit, based on a server communication status which is (i.e., represents) a state of data transmission to the server. The server communication unit transmits, to the server, the data determined to have a highest priority by the priority determination unit among the data based on the sensor and the data backed up in the backup management unit, and determines the server communication status based on whether communication fails.

DETAILED DESCRIPTION

Hereinafter, the present invention will be described through the following embodiments, but the following embodiments do not limit the invention. Further, all combinations of features of the invention described in the followings embodiments are not necessarily indispensable to the present invention.

Figure 1:
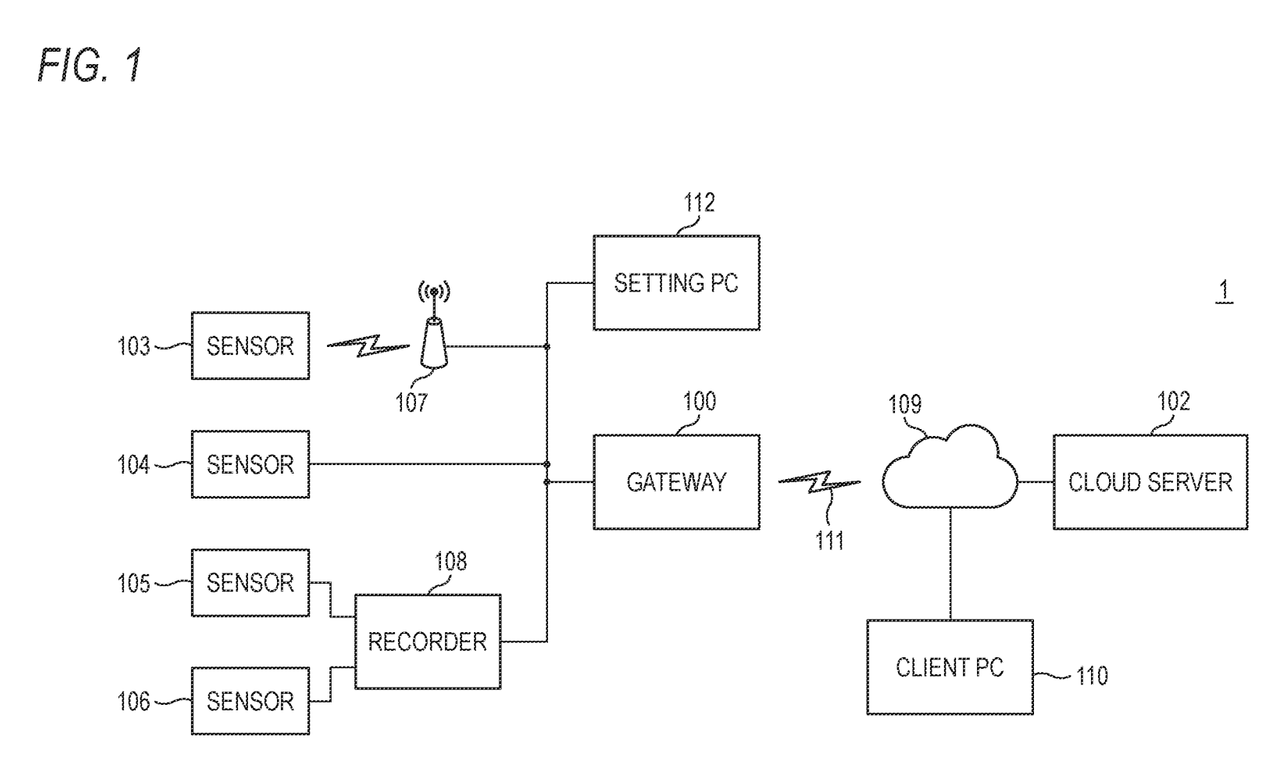
FIG. 1 is an overall configuration diagram of a cloud service according to one or more embodiments of the present invention.

FIG. 1 is an overall configuration diagram of a cloud service 1 in which a gateway 100 is used as a relay device according to one or more embodiments. The cloud service provides computing resources such as servers owned by a cloud provider. By using the cloud service, a user does not need to possess computing resources and can use the computing resources via a network such as the Internet or the like. The cloud service in one or more embodiments provides a service of collecting sensor data from various locations on a server and adds an added value to the data. One or more embodiments of the cloud service 1 shown in FIG. 1 includes sensors 103 to 106, a wireless access point 107, a gateway 100, an Internet 109, a cloud server 102, a client PC 110, and a setting PC 112.

The sensors 103 to 106 are devices which convert a measured value, which is sensing data of a target, into an electrical signal which can be handled by a computer. The sensors 103 to 106 are, for example, a pressure sensor, a pH sensor, a vibration sensor, a temperature sensor, a flow rate sensor, a corrosion sensor, a strain sensor, a noise sensor, a gas sensor, a voltage sensor, a current sensor, a level sensor, or the like. The sensors 103 to 106 transmit the measured value through communication. For example, Ethernet (registered trademark), serial communication, or Wi-Fi (registered trademark) is used as the communication for transmitting the measured value.

The wireless access point 107 converts the measured value of the wireless sensor 103 using wireless communication into wired communication. The wireless communication used for the wireless sensor 103 is, for example, Wi-Fi. In one or more embodiments, the wireless access point 107 converts signals of Wi-Fi to signals of wired Ethernet.

A recorder 108 is an instrument which records sensor data in a memory or on a recording paper. In one or more embodiments, the recorder 108 collects sensor data from one or a plurality of sensors and records the sensor data in a memory in the recorder 108. In addition, the recorder 108 transmits the collected sensor data in real time via communication. In one or more embodiments, the recorder 108 collects sensor data of the sensor 105 and sensor data of the sensor 106, and transmits the collected sensor data to the gateway via, for example, Ethernet.

Basically, the sensors 103 to 106 and the recorder 108 continuously record and transmit the measured value to the sensor data during operation. If the measured value cannot be output due to, for example, a failure or the like, the sensors 103 to 106 and the recorder 108 add an alarm to the sensor data and transmit the alarm.

In one or more embodiments, the gateway 100 is a so-called IoT gateway. That is, the gateway 100 is a relay device which directly transmits communication data from each network device connected to the gateway 100 via the Internet to a server on the network. Further, the gateway 100 collects the sensor data from one or the plurality of sensors, converts a format into communication data (hereinafter, referred to as server communication data) adapted to a server of a transmission destination, and transmits the data. More specifically, the gateway 100 converts the sensor data collected from the sensors 103 to 106 of one or more embodiments into a JSON format in ASCII. The reason for converting the format is to unify the formats of sensor data which vary according to the types of the sensors. That is, the gateway 100 transmits the data converted into the JSON format to the cloud server 102 via the Internet 109 using cellular communication 111, which is a wireless communication interface protocol such as 3G/LTE.

The setting PC 112 connected to the gateway 100 is a device for performing various settings of the gateway 100. Various settings of the gateway 100 include, for example, settings relating to a network such as an IP address, registration of a sensor device of a transmission source of sensor data, and registration of a server of the transmission destination. The setting PC 112 is connected to the gateway 100 via, for example, Ethernet. In order to perform various settings of the gateway 100, a setting value is input by logging in from the setting PC 112 to the gateway 100 and activating a setting tool. The setting PC 112 can install software in the gateway 100 to cause the gateway 100 to function. Further, the setting PC 112 can activate the software installed in the gateway 100.

The cloud server 102 is a server device provided by the cloud service 1. The cloud server 102 performs various kinds of processing such as visualization, analysis, and diagnosis of the server communication data received from the gateway 100 by an application. As the visualization of data, the cloud server 102 generates a graph based on, for example, a change in the measured value of the sensor included in the received data. The cloud server 102 performs, for example, a calculation of a minimum value and a maximum value of the measured values in a predetermined period of data for data analysis. Further, the cloud server 102 diagnoses, for example, an abnormal state of a manufacturing process based on a result of the data analysis. In addition, the cloud server 102 may transmit a mail to a mail address of a previously registered user in order to notify the user of the abnormality or the like of the manufacturing process.

The client PC 110 receives data processed by the cloud server 102 via the Internet 109. Accordingly, the user of the client PC 110 can browse, on a screen of the client PC 110, for example, a measured value in the generated graph or the result of the data analysis. Further, the user of the client PC 110 can refer to the mail transmitted from the cloud server 102. In addition to a desktop PC and a notebook PC, a tablet terminal, a smartphone, or a mobile phone may be used as the client PC 110.

With respect to the gateway 100 used in the cloud service 1, in a conventional IoT gateway, the communication may be temporarily interrupted due to a poor radio wave condition of the cellular communication 111. While the IoT gateway is interrupted, the IoT gateway cannot transmit the sensor data transmitted from the sensor to the cloud server 102. Thereafter, when the cellular communication 111 is reconnected by improving the radio wave condition, the IoT gateway converts the sensor data transmitted from the sensor after being reconnected to the server communication data and transmits the data to the cloud server 102. That is, the sensor data during the temporary interruption of the cellular communication 111 is discarded. Therefore, there is a possibility that an error occurs in the data analysis performed by the cloud server 102. For example, when the calculation of the minimum value or the maximum value of the measured values of the predetermined period of the data is performed, the data including the maximum value and the minimum value is lost due to the communication failure, so that the correct minimum value and the maximum value may not be obtained. Further, when a graph is generated based on the measured value, a losing portion of the data is not displayed. Further, when the cloud server 102 diagnoses the tendency of abnormality of the manufacturing process or the like based on the result of the data analysis and transmits the mail to the user, the determination of transmitting the mail is wrong since the data is lost, and the mail may not be transmitted even when the mail should be transmitted.

In order to make the cloud server 102 receive data which cannot be transmitted from the gateway 100 to the cloud server 102 due to the data loss, for example, the gateway 100 may cache data. In this case, after the communication is restored, deficient data is requested to be transmitted from the cloud server 102 to the gateway 100, and the gateway 100 can prevent the data loss by transmitting necessary data out of the cached data to the cloud server 102. However, in the cloud service 1 used in the manufacturing process such as a plant or a factory, mutual communication between the gateway 100 and the cloud server 102 should not occur because of the necessity of processing a large amount of sensor data. Therefore, it is necessary to transmit data from the gateway 100 to the cloud server 102 in one direction as continuously as possible.

On the other hand, there are several types of sensor data, including those that include measured values, those that include alarms that indicate sensor abnormality, and those that include notifications when the sensors change settings, and transmission priorities may be higher than measured values. Depending on a content of the data analysis of the application of the cloud server 102, the real-time nature of the plurality of sensor data may be desired to be prioritized. Therefore, even if the gateway immediately transmits the sensor data cached while the cellular communication 111 is temporarily interrupted after the cellular communication is restored, appropriate data having a high priority may not be transmitted.

Therefore, the relay device according to one or more embodiments receives the data based on the sensor and backs up the data under a predetermined condition. After communication is recovered from failure, the relay device selects the received data based on the sensor and the backed up data, based on the desired priority, and transmits the selected data to the server on the network.

Therefore, the relay device determines the priority of the transmission data and transmits the data in one direction without requiring mutual communication with the server of the transmission destination of the data, so that it is possible to retransmit data which cannot be transmitted to the server due to the temporary interruption of the communication. If the data can be retransmitted, the data processing by the server can be performed normally.

The relay device according to one or more embodiments includes a backup management unit, a priority determination unit and a server communication unit. The backup management unit receives data based on a sensor and backs up the data based on the sensor to store the data failed to be transmitted to a server on a network. The priority determination unit determines a priority of data to be transmitted to the server among the data based on the sensor and the data backed up in the backup management unit, based on a server communication status which is a state of data transmission to the server. The server communication unit transmits, to the server, the data determined to have a highest priority by the priority determination unit among the data based on the sensor and the data backed up in the backup management unit, and determines the server communication status based on whether communication fails.

Therefore, the relay device determines the priority of the transmission data and transmits the data in one direction without requiring mutual communication with the server, so that it is possible to retransmit the data which cannot be transmitted to the server due to the temporary interruption of the communication. If the data can be retransmitted, the data processing by the server can be performed normally.

The relay device according to one or more embodiments further includes a priority definition table. The priority definition table defines the priority for transmitting the data to the server. The priority determination unit determines the priority of the data to be transmitted to the server, based on the priority defined in the priority definition table.

Therefore, the relay device can flexibly deal with the specifications of the processing executed by the server for the priority of the transmission data.

The backup management unit of the relay device according to one or more embodiments classifies and backs up the data based on the sensor, based on a data type included in the data based on the sensor.

Therefore, the relay device can easily determine the priority of the transmission data without requiring mutual communication with the server. Thus, data which cannot be transmitted to the cloud due to the temporary interruption of the communication may be retransmitted.

When the backup management unit backs up new data beyond a capacity of a backup area which is provided to back up the data based on the sensor, the backup management unit deletes data having a lower priority than a priority of the new data among all the data stored in the backup area, and backs up the new data.

Therefore, even if the data which cannot be transmitted to the server due to the temporary interruption of communication for a long time cannot be backed up beyond the backup area, the relay device can transmit data with high priority to the server as much as possible.

In the relay device according to one or more embodiments, the data based on the sensor includes a time stamp. The data type includes a participation/withdrawal notification of the relay device to the server, a participation/withdrawal notification of the sensor, a setting change notification of the relay device, a setting change notification of the sensor, an alarm of the sensor and a measured value of the sensor. The priority of the data to be transmitted to the server is defined by a numerical order, and the priority is further defined by an order of newest time stamp among the order defined by the numerical order. The numerical order is:

(1) a participation/withdrawal notification of the relay device to the server, or a participation/withdrawal notification of the sensor;

(2) a setting change notification of the relay device or a setting change notification of the sensor; and (3) an alarm of the sensor or a measured value of the sensor.

Therefore, when the communication is restored after the communication is temporarily interrupted, the relay device can easily determine the priority of the transmission data for which the server can normally perform the data analysis.

Figure 2:
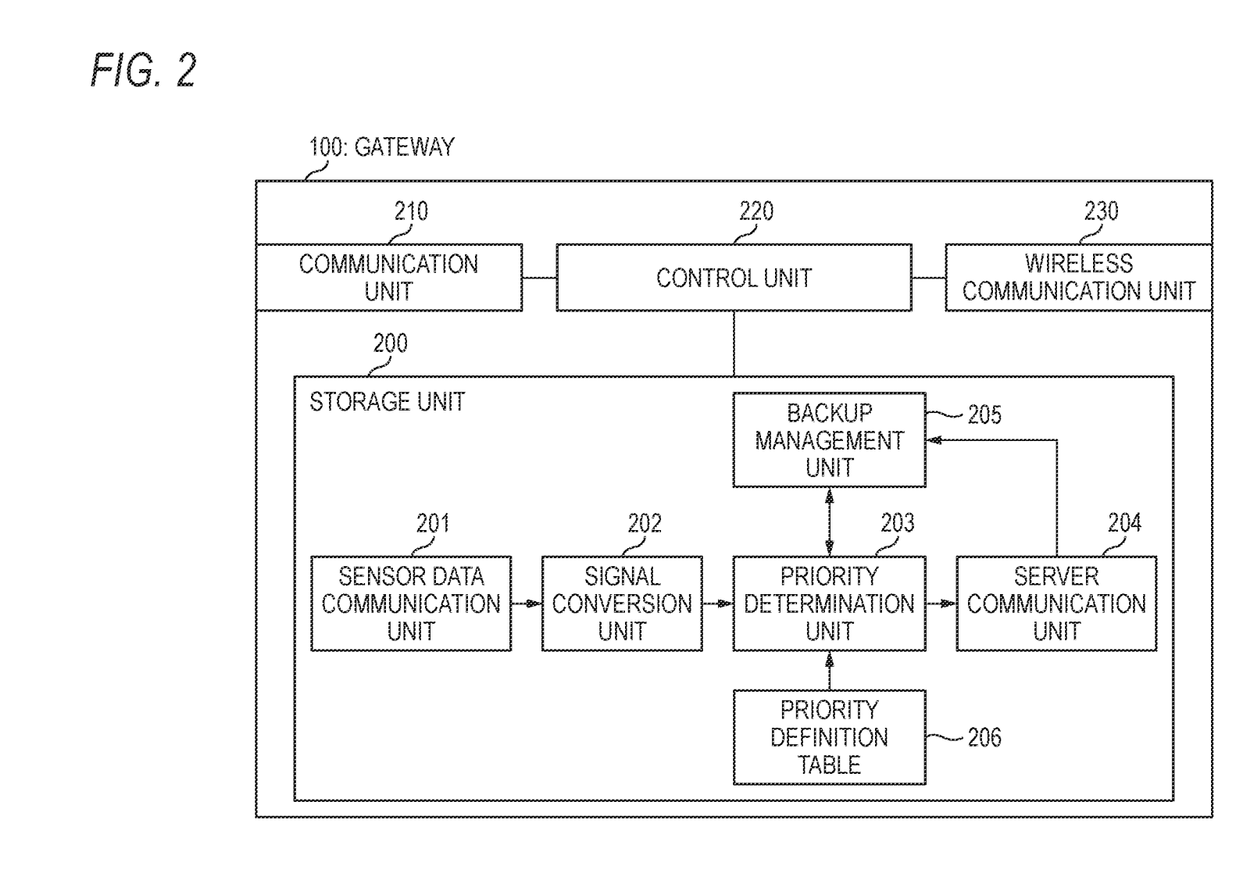
FIG. 2 is an internal configuration diagram of a gateway according to one or more embodiments of the present invention.

FIG. 2 shows an internal configuration of the gateway 100 as a relay device according to one or more embodiments. The gateway 100 includes a communication unit 210, a control unit 220, a wireless communication unit 230, and a storage unit 200. Further, the inside of the storage unit 200 indicates a configuration of software which causes the gateway 100 to function.

The communication unit 210 is an interface for mainly connecting to the sensor. The communication unit 210 is, for example, an Ethernet card. The communication unit 210 is connected to the sensor, which is an IoT device, the recorder connected to the sensor, the wireless access point wirelessly connected to the sensor, or the like, via an Ethernet cable. The communication unit 210 is mainly used for receiving sensor data from various devices at a connection destination. In addition to the Ethernet card, the communication unit 210 may correspond to serial communication such as Bluetooth (registered trademark) and USB.

The control unit 220 is, for example, a Central Processing Unit (CPU). The control unit 220 processes the sensor data received by the communication unit 210 and outputs the processed sensor data from the wireless communication unit 230. The control unit 220 operates by software stored in the storage unit 220.

The wireless communication unit 230 is a cellular communication interface which is wireless communication. The cellular communication is, for example, a wireless communication interface protocol used for a mobile phone such as 3G/4G/LTE. Here, 3G refers to a communication standard of a third generation, 4G refers to a communication standard of a fourth generation, and LTE refers to Long Term Evolution. The wireless communication unit 230 transmits data to the cloud server 102 via the Internet by the cellular communication.

The communication unit 210 can also be used to connect to the setting PC 112. The setting PC 112 can log in to the gateway 100 via the communication unit 210. The setting PC 112 is used to perform various settings of the gateway 100. The various settings include, for example, setting relating to a network such as an IP address, registration of a sensor of the transmission source of sensor data, registration of a cloud server of the transmission destination, or the like.

The storage unit 200 is a storage device for storing a program to be executed by the control unit. For example, a Random Access Memory (RAM) which is a volatile memory is used as the storage unit 200. Here, the RAM is, for example, a Static RAM (SRAM), a Dynamic RAM (DRAM), or a Synchronous DRAM (SDRAM). The software stored in the storage unit 200 may be stored in advance in an auxiliary storage device (not shown) in the gateway 100 connected to the setting PC 112 via the communication unit 210, for example. Further, a program stored in the auxiliary storage device of the gateway 100 may be activated from the setting PC 112 and stored in the storage unit 200. The auxiliary storage device is a non-volatile storage device, and for example, a Hard Disk Drive (HDD), a Solid State Drive (SSD), or the like is used.

Software stored in the storage unit 200 for causing the gateway 100 to function includes a sensor data communication unit 201, a signal conversion unit 202, a priority determination unit 203, a server communication unit 204, a backup management unit 205, and a priority definition table 206.

The sensor data communication unit 201 acquires sensor data received by the communication unit 210 in the storage unit 200. The sensor data communication unit 201 acquires sensor data while sequentially switching registered sensors at a predetermined time interval. The predetermined time interval is, for example, 10 seconds. The sensor data acquired by the sensor data communication unit 201 is sequentially passed to the signal conversion unit 202.

The signal conversion unit 202 converts the format of the sensor data into a format 400 of the server communication data. Here, the server communication data is of a format which can be handled by the cloud server 102 at the transmission destination. More specifically, the server communication data is, for example, a JSON format in ASCII. That is, the signal conversion unit 202 converts the format of the sensor data, which is different from another sensor, into the format of the server communication data, so that the data is unified in one format and can be easily handled.

Figure 4:
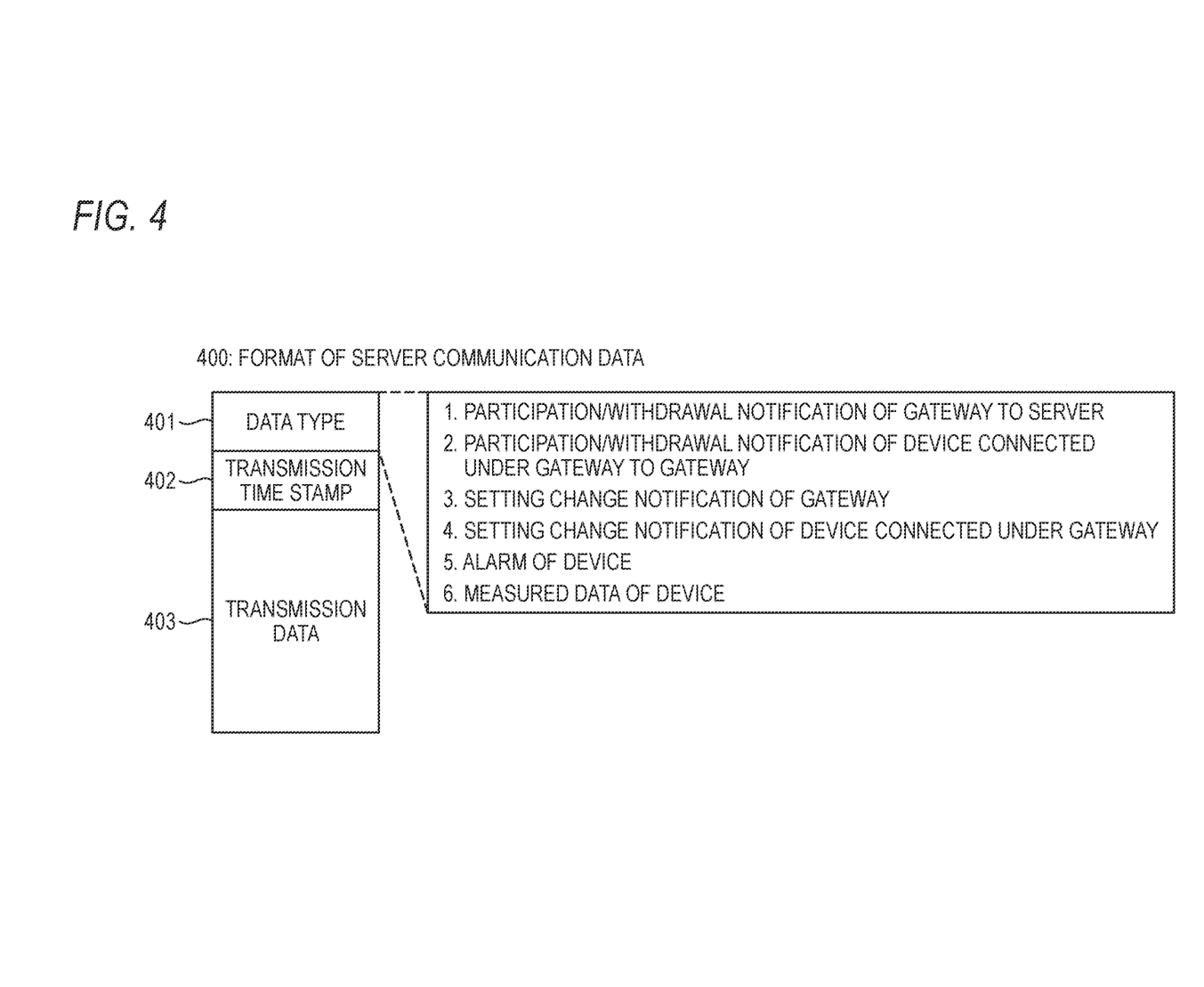
FIG. 4 is a format of server communication data according to one or more embodiments of the present invention.

The format 400 of the server communication data output by the signal conversion unit 202 is shown in FIG. 4. The server communication data includes a data type 401, a transmission time stamp 402, and transmission data 403. The data type 401 indicates the type of the server communication data. The data type includes, for example, the following six data types.

1. A participation/withdrawal notification of the gateway to/from the server refers to participation or the withdrawal of the gateway to or from the server. For example, when the gateway 100 is powered on and the gateway 100 is connected to the cloud server 102, the data type is participation; when the setting PC 112 gives the gateway 100 an instruction to disconnect the connection with the cloud server 102, the data type is withdrawal. The server communication data is generated at each timing of participation and withdrawal. When the cloud server 102 receives the notification, if the data type is "participation", the cloud server 102 recognizes that data is transmitted from the gateway 100. When the cloud server 102 receives the notification, if the data type is "withdrawal", the cloud server 102 recognizes that data is not transmitted from the gateway 100. Information which specifies the gateway 100 is written in transmission data 504 by the signal conversion unit 202.

2. A participation/withdrawal notification of a device connected under gateway refers to participation or withdrawal of the device. When the device such as a sensor is registered and connected to the gateway 100, the device is "participation"; when the device is deregistered and disconnected, the device is "withdrawal". The server communication data is generated at each timing of participation and withdrawal. When the cloud server 102 receives the notification, the cloud server 102 recognizes that the data is transmitted from the device if the data type is "participation"; the cloud server 102 recognizes that the data is not transmitted from the device if the data type is "withdrawal". Information specifying the device is written in the transmission data 403 of the server communication data by the signal conversion unit 202.

3. A setting change notification of the gateway indicates that the setting of the gateway 100 is changed. For example, the setting change of the gateway 100 is performed from the setting pc 112 via the communication unit 210. Setting contents are written in the transmission data 403 of the server communication data by the signal conversion unit 202.

4. A setting change notification of the device connected under the gateway indicates that the setting of the device is changed. For example, the setting change of the device is caused by an operation on the device. The setting contents are written in the transmission data 403 of the server communication data by the signal conversion unit 202 which receives information from the device as sensor data.

5. An alarm sensor of the device refers to an alarm caused by a failure or the like of a device such as a recorder. The alarm contents are written in the transmission data 403 of the server communication data by the signal conversion unit 202 which receives the information from the device as sensor data. After the conversion by the signal conversion unit 202, among the data input to the priority determination unit 203 for the first time, the alarm of the device is regarded as belonging to this type and the priority is determined.

6. Measured data of the device refers to the measured value measured by the sensor. The measured value is written in the transmission data 403 of the server communication data by the signal conversion unit 202 which receives the information from the device as sensor data.

The priority determination unit 203 selects the data having the highest priority from the data output from the signal conversion unit 202 and the data backed up in the backup management unit 205, and transmits the data to the server communication unit 204. The data with high priority is determined based on the definition of the priority definition table 206. The priority of the data type 401 is written in the priority definition table 206. In addition, it is determined whether the transmission time stamp 402 is included in priority determination conditions, and the magnitude relation of the time recorded in the transmission time stamp 402 having the high priority is written. The definition of the priority written in the priority definition table 206 can be rewritten as necessary, for example, from the setting PC 112 via the communication unit 210.

The server communication unit 204 transmits the data selected by the priority determination unit 203 to the wireless communication unit 230 in order to transmit the data to the cloud server 102. Then, the wireless communication unit 230 transmits data to the cloud server 102 registered in the gateway 100 by the cellular communication. Next, the server communication unit 204 receives, from the wireless communication unit 230, a result of whether the transmission of data succeeds or fails. If the transmission of the data fails, the server communication unit 204 transmits the data which fails to be transmitted to the backup management unit 205.

By saving the data which fails in transmission, the backup management unit 205 prevents loss of data, which cannot be transmitted, from the present system. Then, the backup management unit 205 classifies the server communication data by each type written in the data type 401, and stores the data which fails to be transmitted. The data type to be classified is acquired from the priority definition table 206. Among the data classified by the data type and backed up in the backup management unit 205, the priority determination unit 203 selects the data type having the highest priority of the data type and further selects the data type having the highest priority order of the transmission time stamp 401. Next, the priority determination unit 203 selects data which is determined to have a high priority according to the definition of the priority definition table 206 among the selected data and the data received from the signal conversion unit 202. The selected data is passed to the server communication unit 204.

Here, when the cellular communication is disordered for a long time, since the backup data increases, the backup management unit 205 may fill up a memory capacity for backing up the data. In such a case, data having a high priority can be backed up by removing data having a lower priority than the priority of the data to be backed up, among the already backed up data.

[Software Operation]

Figure 3:
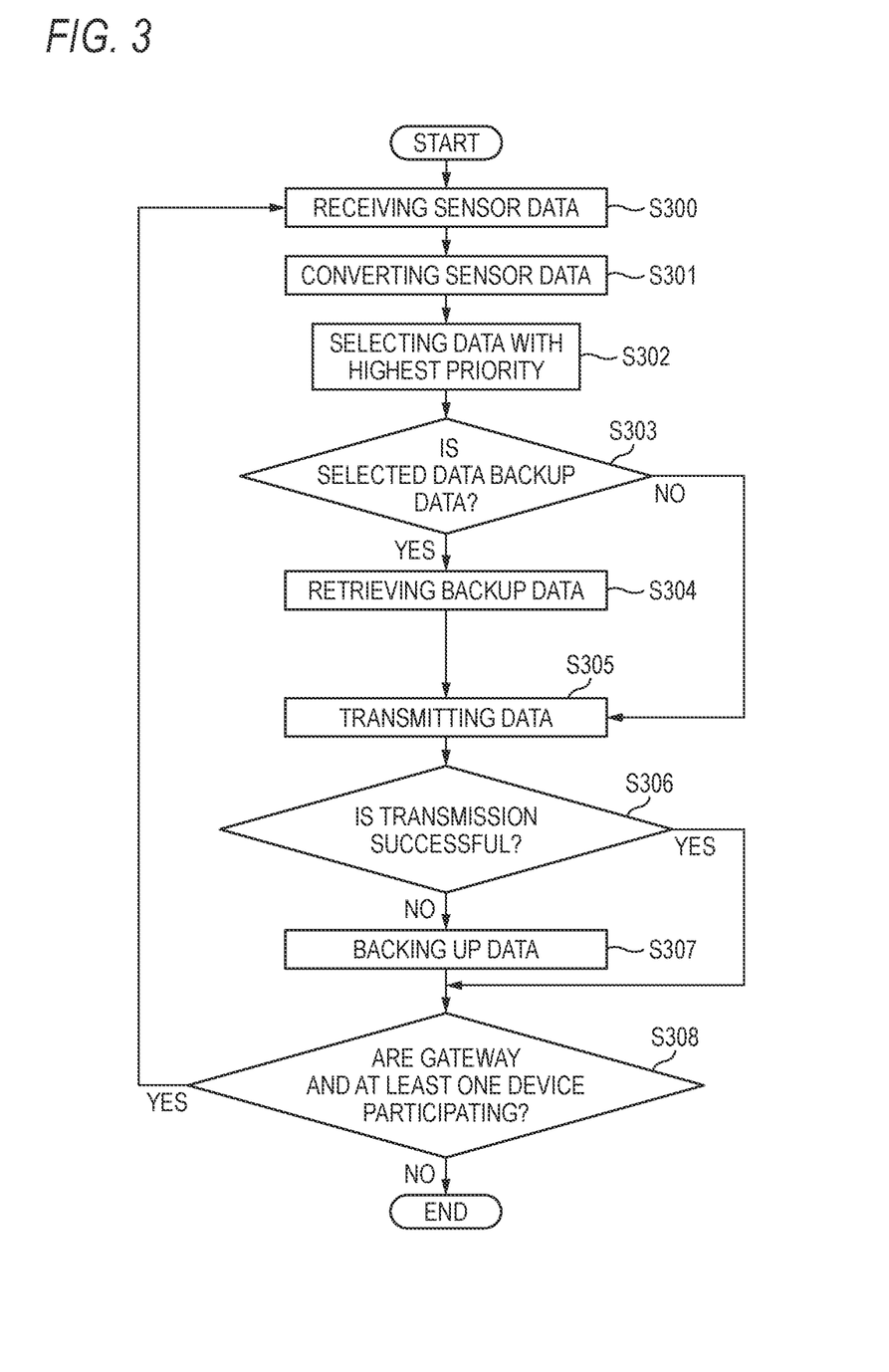
FIG. 3 is a flowchart of software of the gateway according to one or more embodiments of the present invention.

FIG. 3 is a flowchart showing the operation of the gateway 100. By executing the software installed in the gateway 100 along with the flow of FIG. 3, it transmits the sensor data collected from the sensors to the cloud server 102.

The sensor data communication unit 201 is connected to the communication unit 210 via Ethernet, and receives the sensor data of the device such as a sensor registered in the gateway 100 (S300). When a plurality of devices are registered in the gateway 100, the sensor data communication unit 201 receives sensor data while sequentially switching target devices at predetermined time intervals. Here, the predetermined time may be a default value of the software of the gateway 100, or may be a value set from the setting PC 112 connected via the communication unit 210. The specific predetermined time is, for example, 10 seconds. Further, the received sensor data may include an alarm which indicates a measured value measured by the device, an abnormality of the device, or the like.

The signal conversion unit 202 converts the sensor data received by the sensor data communication unit 201 into the format of the server communication data (S301). The format of the server communication data is as described above with reference to FIG. 4. When the cloud server 102, which is the transmission destination of the server communication data, is registered in the gateway 100, the signal conversion unit 202 generates server communication data in which the data type 401 is "participation notification of the gateway to the server". When the registration of the cloud server 102, which is the transmission destination of the server communication data, is released from the gateway 100, the signal conversion unit 202 generates server communication data in which the data type 401 is "withdrawal notification of the gateway from the server". When the two types of server communication data are generated, the signal conversion unit 202 may write a domain name, an IP address, a MAC address, or the like of the gateway, which are information for specifying the gateway in the transmission data 403 of the server communication data. In addition, when a device, which is a transmission source of sensor data, is newly registered in the gateway 100, the signal conversion unit 202 generates server communication data in which the data type is "participation notification of the device connected under the gateway". When the registration of the device, which is the transmission source of the sensor data, is released from the gateway 100, the signal conversion unit 202 generates server communication data in which the data type is "withdrawal notification of the device connected under the gateway". When the two types of server communication data are generated, the signal conversion unit 202 may write information identifying the device, for example, the domain name, the IP address, the MAC address, or the like of the device in the transmission data 403 of the server communication data. Further, the signal conversion unit 202 writes the time at which the server communication data is transmitted from the gateway 100 in the transmission time stamp 402 of the server communication data.

The priority determination unit 203 selects data having the highest priority among the server communication data output from the signal conversion unit 202 and the server communication data backed up in the backup management unit 205 (S302).

Figure 5:
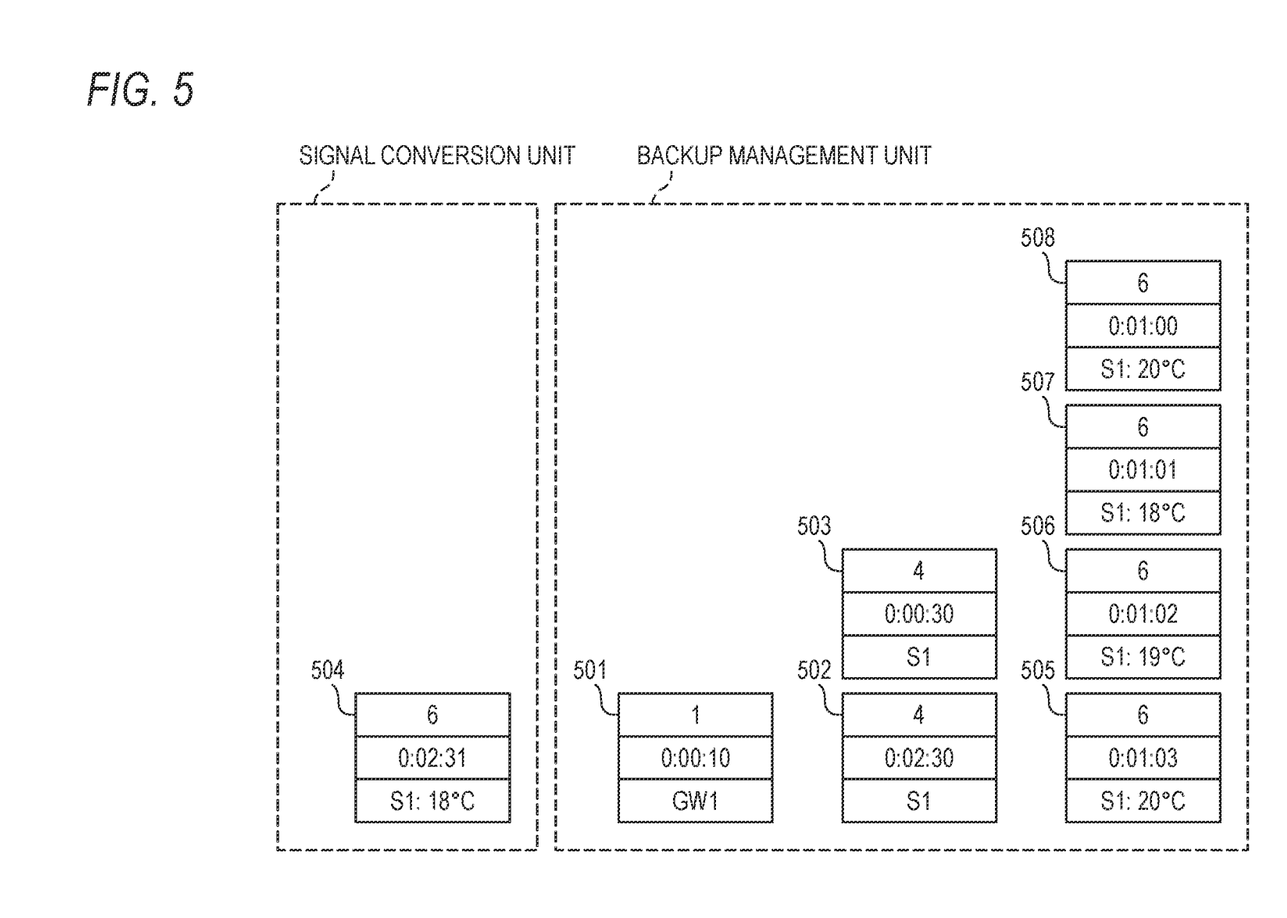
FIG. 5 is an example of the priority of transmission of the server communication data according to one or more embodiments of the present invention.

A specific example of how to determine the priority will be described with reference to FIG. 5. FIG. 5 shows an example of data to be subjected to priority determination by the priority determination unit 203. Here, in the backup management unit 205, data 501 having a first data type, data 502 and 503 having a fourth data type, and data 505 to 508 having a sixth data type are backed up due to a failure of the cellular communication. The data of the backup management unit 205 is collectively stored for each data type. Further, in each data type, the time at which the data is written in the time stamp is arranged in a new order from the bottom. That is, in the case of FIG. 5, data is stored in a descending order of priority from the bottom.

Here, as shown in FIG. 4, it is assumed that the priority is set to be higher in the order in which the number of the data type is smaller. That is, in the case of FIG. 5, since the data 501 having the first data type has the highest priority, the data 501 is first passed to the server communication unit 204. The next highest priority is the fourth data type and the newest data 502, and the next highest priority is the next newest data 503. The next highest priority is the data 504 to 508 having the sixth data type. Among these, the data 504 with the latest time stamp time has the highest priority. The priority is in the order of the data 505, the data 506, the data 507, and the data 508 which is the next new order.

The data output from the signal conversion unit 202 is usually newer than the data backed up normally for the measured data of the device having the sixth data type and the alarm of the device having the fifth data type. Therefore, the data output from the signal conversion unit 202 has a higher priority. That is, the measured data of the backed up device and the alarm of the device are output after the measurement data of the device and the alarm of the device do not come into the signal conversion unit 202.

The priority of the data type 401 is described with reference to FIG. 4, but it is not limited thereto, and can be set in any manner by changing the setting of the priority definition table 206. Further, the data having newer time written in the transmission time stamp 402 has a higher priority. However, the priority is not limited thereto, and it is also possible to set the priority in the priority order definition table 206 such that the priority of the data with old time is increased. When data processing requiring real-time property is performed in the cloud server 102, the priority of the data with the new time is set to be higher, and when the data processing in which the data order is more important than the real time property is performed, the setting may be selectively used so as to increase the priority of the data with the old time.

Incidentally, the priority of the data with the new time can be increased by using a stack type data structure which is a first-in last-out method. On the other hand, the priority of the data with the old time can be increased by using a cue type data structure which is a first-in first-out method.

When the selected data is the backup data (S303), the priority determination unit 203 extracts the selected backup data from the backup management unit 205 (S304). For example, when the data 501 is selected and transmitted to the server communication unit 204 in FIG. 5, the priority determination unit 203 extracts the data 501 from the backup management unit 205. As a result, the data 501 is deleted from the backup management unit 205.

The server communication unit 204 transmits the data selected by the priority determination unit 203 to the wireless communication unit 230, to transmit the data to the cloud server 102 through the cellular communication (S305). If the transmission fails (S306: No), the server communication unit 204 passes the data, which fails to be transmitted, to the backup management unit 205, and the backup management unit 205 backs up the received data (S307). At this time, in order to allow the data having a high priority to be extracted based on the data type 401, as shown in FIG. 5, the backup management unit 205 classifies the data by each data type and stores the data. If the transmission is successful, the data is not backed up (S306: Yes).

When the data is backed up, the backup memory area of the backup management unit 205 may be full. In this case, data with high priority is backed up and stored. That is, when the backup management unit 205 acquires data which fails in communication from the server communication unit 204, if the memory capacity of the backup data is full, the backup management unit 205 checks the priority of the backup data based on the priority defined in the priority definition table 206. If there is backup data having a lower priority than the data acquired from the server communication unit 204, the backup management unit 205 deletes the data having the lower priority and ensures the memory area, and then backs up the data acquired from the server communication unit 204. If there is no backup data having a lower priority than the data acquired from the server communication unit 204, the data acquired from the server communication unit 204 is discarded.

When the data type of the data transmitted by the server communication unit 204 is "withdrawal notification of the gateway to the server", or "withdrawal notification of the device connected under the gateway" is transmitted for all devices registered in the gateway 100, the processing ends (S308: No). When the participation of the gateway 100 to the server is continued and the participation of at least one device connected under the gateway 100 is continued (S308: Yes), the processing returns to the processing of receiving the sensor data (S300).

Figure 6:
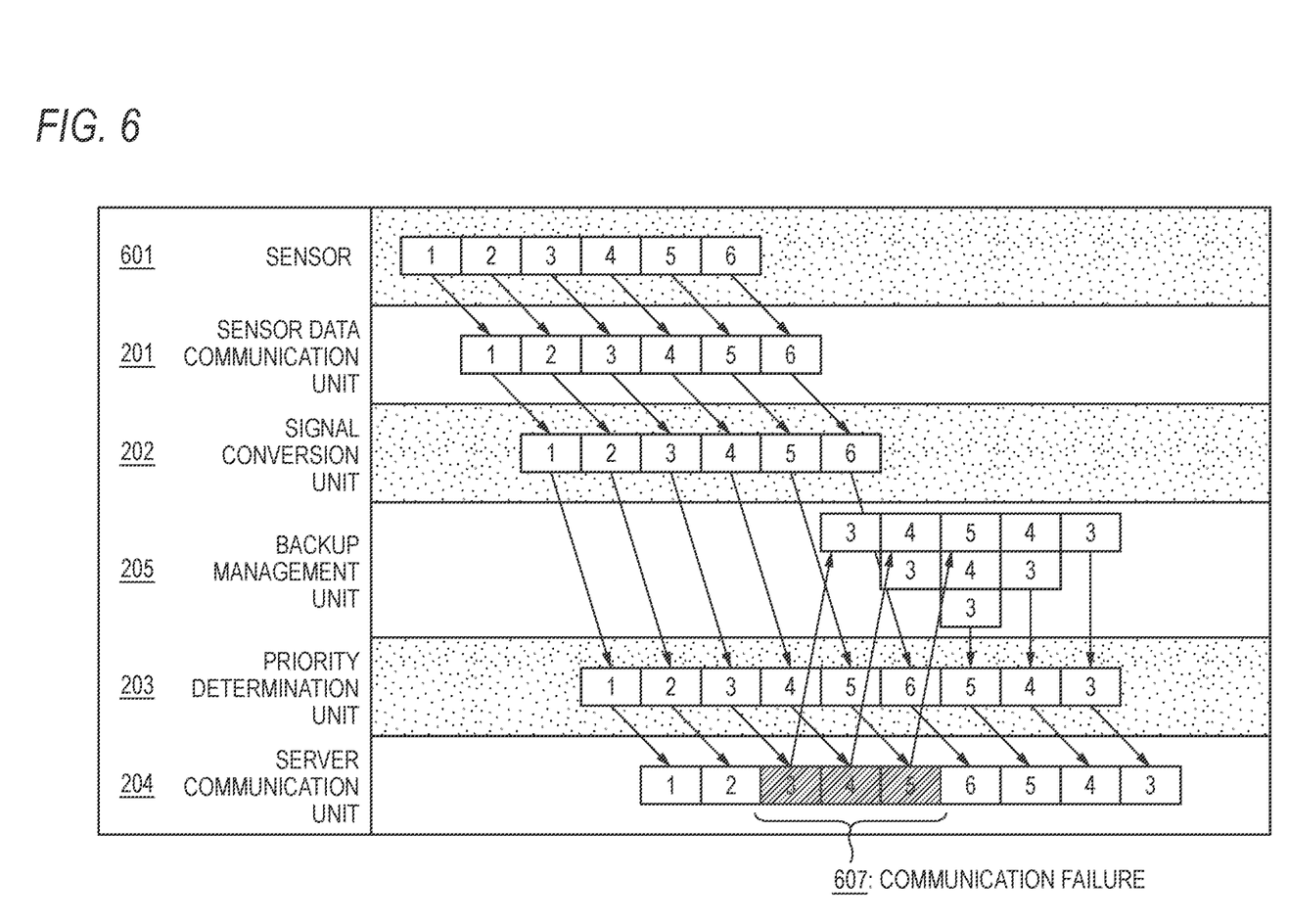
FIG. 6 is a time chart illustrating an operation of the gateway according to one or more embodiments of the present invention.

FIG. 6 is a timing chart according to one or more embodiments. FIG. 6 describes the operation of the gateway 100 in time series. It is assumed that all data types 401 for the data in FIG. 6 are "measured data of the device".

The measurement data coming from a sensor 601 is acquired by the sensor data communication unit 201. Then, the format is converted by the signal conversion unit 202. Next, the first data output from the signal conversion unit 202 is selected by the priority determination unit 203 since there is no data in the backup management unit 205. Accordingly, the server communication unit 204 transmits the first data. Similarly, the second data is output from the server communication unit 204.

Next, it is assumed that the third to the fifth data cannot be transmitted in the server communication unit 204 due to a failure 607 in the cellular communication. In this case, the third data is stored in the backup management unit 205 after the communication failure occurs in the server communication unit 204. Similarly, the fourth data is also stored in the backup management unit 205. At this point, the data stored in the backup management unit 205 is the third and the fourth data. The fifth data is also stored in the backup management unit 205. The total number of the data stored in the backup management unit 205 is three from the third to the fifth data.

On the other hand, when the third to the fifth data is received from the signal conversion unit 202, the priority determination unit 203 selects the third to the fifth data received from the signal conversion unit 202 because there is no data in the backup management unit 205. Next, when the sixth data is output by the signal conversion unit 202, the third data is present in the backup management unit 205. In this case, since the sixth data is newer than the third data, the priority determination unit 203 selects the sixth data. Therefore, the sixth data is transmitted from the server communication unit 204. The transmission succeeds.

Next, the sixth data is not output from the signal conversion unit 202 at the end. Therefore, the priority determination unit 203 selects the latest fifth data stored in the backup management unit 205 next to the sixth data. Then, the server communication unit 204 transmits the fifth data. The transmission succeeds. At the same time, the fifth data is extracted from the backup management unit 205. As a result, the data remaining in the backup management unit 205 becomes the third and the fourth data. Similarly, the priority determination unit 203 sequentially selects the fourth and the third data stored in the backup management unit 205. Therefore, the server communication unit 204 transmits the fourth and third data in this order. The transmission succeeds.

With the above sequence, the gateway 100 transmits the sensor data to the cloud server 102 based on the defined priority.

Figure 7:
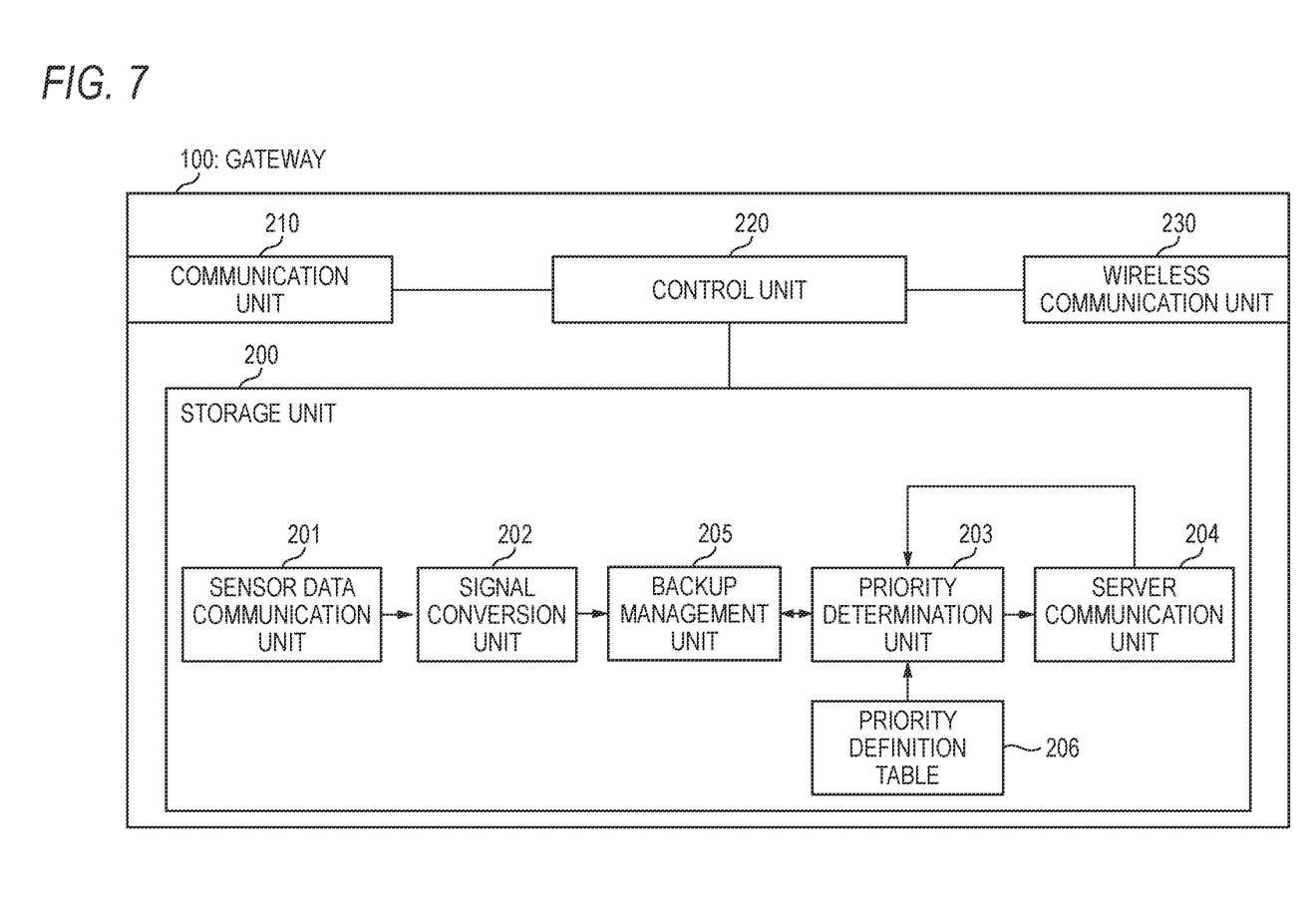
FIG. 7 is an internal configuration diagram of a gateway according to one or more embodiments of the present invention.

FIG. 7 shows the internal configuration of the gateway 100 according to one or more embodiments. Each of the components is the same as that of FIG. 2, and the same components are assigned the same reference numerals. FIG. 7 differs from FIG. 2 in the position of the backup management unit 205. In FIG. 2, the backup management unit 205 is located between the server communication unit 204 and the priority determination unit 203, but in FIG. 7, the backup management unit 205 is located between the signal conversion unit 202 and the priority determination unit 203. Even in this arrangement of FIG. 7, the same function as the gateway 100 in the configuration of FIG. 2 can be realized.

An operation sequence differs between the configuration of FIG. 7 and the configuration of FIG. 2. In the configuration of FIG. 7, the backup management unit 205 backs up the data regardless of the presence or absence of communication failure, and after it is confirmed that the communication succeeds in the server communication unit 204, the priority determination unit 203 extracts the data backed up by the backup management unit 205. In the configuration of FIG. 2, after the server communication unit 204 fails to communicate, the data which fails to be transmitted to the backup management unit 205 is backed up and stored.

Figure 8:
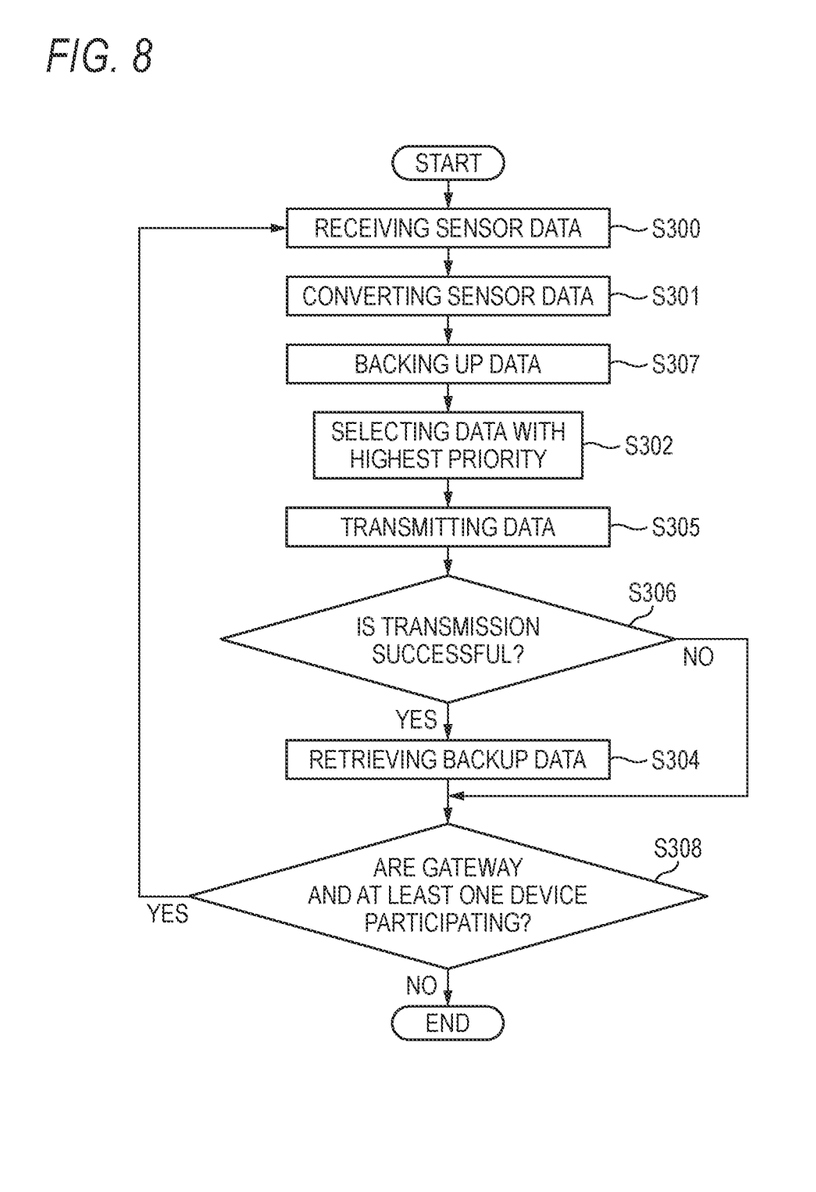
FIG. 8 is a flowchart of software of the gateway according to one or more embodiments of the present invention.

FIG. 8 is a flowchart describing the operation of the gateway 100 according to one or more embodiments. The operation will be described below with reference to FIG. 8. The sensor data communication unit 201 receives the sensor data (S300). Next, the signal conversion unit 202 converts the sensor data into the format 400 of the server communication data (S301).

Next, the backup management unit 205 backs up the server communication data output from the signal conversion unit 202 (S307). In this case, the points of classifying the data by each data type 401 and backing up the data are the same as those described with reference to FIG. 3. Based on the definition of the priority definition table 206, the priority determination unit 203 selects the data having the highest priority from the data backed up in the backup management unit 205. The data selected by the priority determination unit 203 is transmitted from the server communication unit 204 via the wireless communication unit 230 to the cloud server 102 through the cellular communication (S305).

Information indicating whether the transmission by the cellular communication succeeds is transmitted from the server communication unit 204 to the priority determination unit 203. When the transmission is successful (S306: YES), the priority determination unit 203 extracts the backup data which is backed up in the backup management unit 205 and which succeeds in the transmission (S304). As a result, the data which is successfully transmitted disappears.

When the transmission fails (S306: No), the priority determination unit 203 does not extract the backup data. As a result, since the data fails to be transmitted remains backed up in the backup management unit 205, the data can be transmitted after the cellular communication is restored.

If the gateway and at least one device participate (S308: Yes), the processing returns to the processing of receiving the sensor data (S300). Otherwise (S308: No), the processing ends.

Although the present invention has been described using the above embodiments, the technical scope of the present invention is not limited to the scope of the above-described embodiments. It is apparent to those skilled in the art that various modifications or improvements may be added to the above embodiments. It is apparent from description of the claims that modes with such modifications or improvements may be included in the technical scope of the present invention.

In one or more embodiments of the present invention, the functions of the gateway 100 are realized by the software, but the functions of the gateway 100 need not necessarily be realized by the software and may be realized by dedicated hardware. For example, a gate array, a Field Programmable Gate Array (FPGA), a Programmable Logic Device (PLD), or the like may be used.

In one or more embodiments of the present invention, the gateway 100 exemplifies a so-called IoT gateway in which various settings and software activation are performed by the setting PC 112. However, the IoT gateway having such a configuration is not necessarily required, and may be realized by, for example, a desktop PC including an input/output device such as a mouse, a keyboard, a display, or the like, a server dedicated machine, a notebook PC, a virtual machine, or the like. Then, the various settings and the software activation may be performed by operating the input/output device included in the gateway 100. The software may be activated in accordance with the activation of the gateway 100.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A relay device comprising:
 a memory; and
 a hardware processor coupled to the memory, wherein the hardware processor:
  receives, from a sensor, a plurality of data to be transmitted to a server on a network;
  among the plurality of data, backs up, in the memory, untransmitted data that has failed to be transmitted to the server;
  determines a transmission priority among the backed-up data and new data received from the sensor that also has not yet been transmitted to the server;
  transmits, to the server, data determined to have a highest transmission priority among the new data and the backed-up data; and
  determines a server communication status based on whether communication with the server fails.

2. The relay device according to claim 1, wherein the hardware processor further determines the transmission priority based on a priority definition table that defines the transmission priority.

3. The relay device according to claim 1, wherein the hardware processor further classifies and backs up the untransmitted data based on a data type included in the untransmitted data.

4. The relay device according to claim 1, wherein if a capacity of a backup area of the memory has been exceeded when the hardware processor backs up the untransmitted data into the memory, the hardware processor further:
 deletes data, among all data stored in the backup area, with a lower transmission priority than the untransmitted data, and
 backs up the untransmitted data after deleting the data with the lower transmission priority.

5. The relay device according to claim 3, wherein
 the untransmitted data from the sensor includes a time stamp,
 the data type includes:
  a participation/withdrawal notification of the relay device to the server;
  a participation/withdrawal notification of the sensor;
  a setting change notification of the relay device;
  a setting change notification of the sensor;
  an alarm of the sensor; and
  a measured value of the sensor, and
 the transmission priority is defined by:
  a numerical order of:
   (1) the participation/withdrawal notification of the relay device to the server, or the participation/withdrawal notification of the sensor;
   (2) the setting change notification of the relay device or the setting change notification of the sensor; and
   (3) the alarm of the sensor or the measured value of the sensor; and
  an order of newest time stamp among an order defined by the numerical order.

6. The relay device according to claim 1, wherein the relay device is a single network gateway.

7. A non-transitory computer-readable recording medium having a program which causes a computer to function as a relay device, the program causing the computer to execute:
 receiving, from a sensor, a plurality of data to be transmitted to a server on a network;
 among the plurality of data, backing up, in a memory, untransmitted data that has failed to be transmitted to the server;
 determining a transmission priority among the backed-up data and new data received from the sensor that also has not yet been transmitted to the server;
 transmitting, to the server, data determined to have a highest priority among the new data and the backed-up data; and determining a server communication status based on whether communication with the server fails.

8. A relay method comprising:

receiving, from a sensor, a plurality of data to be transmitted to a server on a network;

among the plurality of data, backing up, in a memory, untransmitted data that has failed to be transmitted to the server;

determining a transmission priority among the backed-up data and new data received from the sensor that also has not yet been transmitted to the server;

transmitting, to the server, data determined to have a highest priority among the new data and the backed-up data; and determining a server communication status based on whether communication with the server fails.

* * * * *